United States Patent [19]

Lhommelet et al.

[11] 4,025,845
[45] May 24, 1977

[54] SYSTEM WITH PHOTOCOUPLERS FOR AUTOMATIC CHECKING OF OPERATING THYRISTORS

[75] Inventors: Robert Lhommelet, Bois d'Arcy; Jean-Paul Raynal, Fontenay sous Bois, both of France

[73] Assignee: Societe Generale de Constructions Electriques et Mecaniques(ALSTHOM), Paris, France

[22] Filed: Dec. 31, 1975

[21] Appl. No.: 645,908

[30] Foreign Application Priority Data

Jan. 31, 1975 France .............................. 75.03067

[52] U.S. Cl. ................................. 324/51; 324/96; 324/133; 340/248 E
[51] Int. Cl.² ...................................... G01R 31/02
[58] Field of Search ............ 324/96, 133, 51, 28 R, 324/158 D; 340/248 E, 253 E

[56] References Cited

UNITED STATES PATENTS

| | | |
|---|---|---|
| 3,163,801 | 12/1964 | Vansteenkiste ............ 340/248 E X |
| 3,188,526 | 6/1965 | Engel .............. 324/122 X |
| 3,328,692 | 6/1967 | Lyon .............. 324/133 X |
| 3,623,054 | 11/1971 | Wuthrich ................. 340/248 E |
| 3,795,863 | 3/1974 | Umeda et al. ................... 324/96 X |

FOREIGN PATENTS OR APPLICATIONS

| | | |
|---|---|---|
| 868,007 | 4/1971 | Canada ............................. 324/96 |
| 2,060,884 | 6/1972 | Germany .......................... 324/133 |

OTHER PUBLICATIONS

Frankeny, R. F., Drift Indicator IBM Tech. Disc. Bulletin, vol. 14, No. 3, Aug. 1971, p. 724.
Lyons et al., Light–Emitting Diode Circuit IBM Tech. Discl. Bulletin, vol. 14, No. 12, May, 1972, p. 3580.

*Primary Examiner*—Gerard R. Strecker

[57] ABSTRACT

Device for the automatic checking of operating thyristors making it possible to check clearly the good condition of thyristors. It comprises photocouplers connected with resistors, arranged in parallel with a group of thyristors. The outputs of the photocouplers are grouped two by two to form a differential information. Applications: Railway or underground railway equipment.

4 Claims, 8 Drawing Figures

SYSTEM WITH PHOTOCOUPLERS FOR AUTOMATIC CHECKING OF OPERATING THYRISTORS

The present invention concerns a device for the automatic checking of operating thyristors and more particularly of thyristors grouped in order to obtain sufficient voltage response.

It is known that thyristors are limited by the voltage to which they can be subjected and consequently thyristors are arranged in series to produce higher voltages. Nevertheless, a defect occurring in one of the thyristors, if it does not stop the operation of the systems due to the safety margin of the remaining thyristors, is in danger of causing successive destruction of the components which are still intact, subsequent to the reduction of the safety margin. With a view to determining the defective components of a chain, it is known how to arrange a visual checking device such as a lamp or neon tube at the terminals of each of the thyristors. The latter is turned out if the defective thryistor is short-circuited or when the thryistor in good condition is conductive. The disadvantage of that system resides in the fact that the neon tubes are lit up and are turned out even when the thyristors are in good operating condition. Moreover, visual checking alone, especially when it is intermittent, does not make it possible to draw the user's attention infallibly.

The device according to the present invention overcomes that disadvantage. In the latter, indeed, it is possible to supply clear information in the case of the breakdown of a thyristor.

The object of the present invention is a device for the automatic checking of operating thyristors comprising, at the terminals of the current supply source, several identical projecting sections in series each constituted by a thyristor and resistor in parallel with the said thyristor, characterized in that a first photocoupler is arranged in series with the said resistor in the said sections, the direction of conduction of the said first photocoupler being the same as that of the said thyristor and that of the said current supply source.

According to one particularity of the invention, the device comprises, moreover, in the case where the current supply source is of the alternating type, a dioe or a second photocoupler at the terminals of the said first photocoupler connected up in an anti-parallel configuration with the said first photocoupler.

According to another particularity of the invention, the first outputs of the said first and/or second photocouplers are connected together and to the earth, the second outputs of the said first and/or second photocouplers are connected two by two to the input terminals of several "exclusive OR" gates, the output terminals of the said "exclusive OR" gates being connected to the input terminals of an "OR" gate whose output terminal supplies the defect signal actuating an alarm device.

An example of embodiment of the present invention, given only by way of illustration and having no limiting character, will be described hereinbelow with reference to the accompanying diagrammatic FIGS. 1 to 4. The same elements shown in several of those figures bear in all these latter the same reference symbols.

Figure 1:
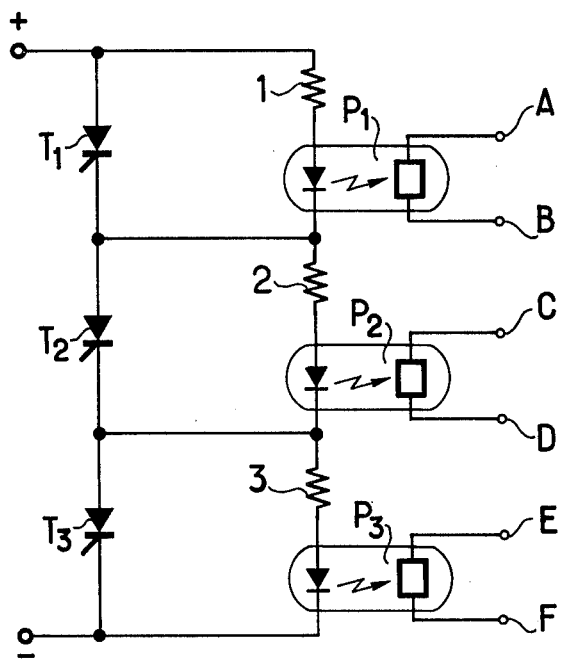
FIG. 1 is a general electronic diagram of a device for the automatic checking of thyristors in the case of a uni-directional voltage source.

FIG. 1 shows the semi-conductor components such as thyristors T1, T2, T3, arranged in series at the terminals of a + − direct-current voltage source. It can be assumed that each of the thyristors withstands a current of 1000 volts at its electrodes and the + − voltage rises to 1500 volts. In that case, if one thyristor in three is defective, the system continues to operate normally. The problem consists in locating the breakdown. For that purpose, a resistor such as 1, 2, 3 and a photocoupler such as P1, P2, P3 are arranged in parallel with each of the thyristors. The photo-couplers P1, P2, P3 are each composed of an electroluminescent diode each of whose cathodes is connected to each of the cathodes of the thyristors T1, T2, T3 and of a photosensitive element having two outputs such as A, B; C, D; E, F.

The resistors 1, 2, 3 have low values in relation to the non-conductive internal resistors T1, T2, T3 and are used for balancing the thyristors for static voltage because the internal resistors of the thyristors are variable from one thyristor to another. The electroluminescent diodes operate with low voltages which can be 1.6 volts and currents of 20 milliamperes. By way of example, the electroluminescent diode of the photocoupler is lit up when there is a voltage at the terminals of the corresponding thyristor. It is turned out when the latter is conductive or when it is short-circuited.

FIG. 1 corresponds to the case where a direct-curent voltage is applied to the thyristors.

Figure 2:
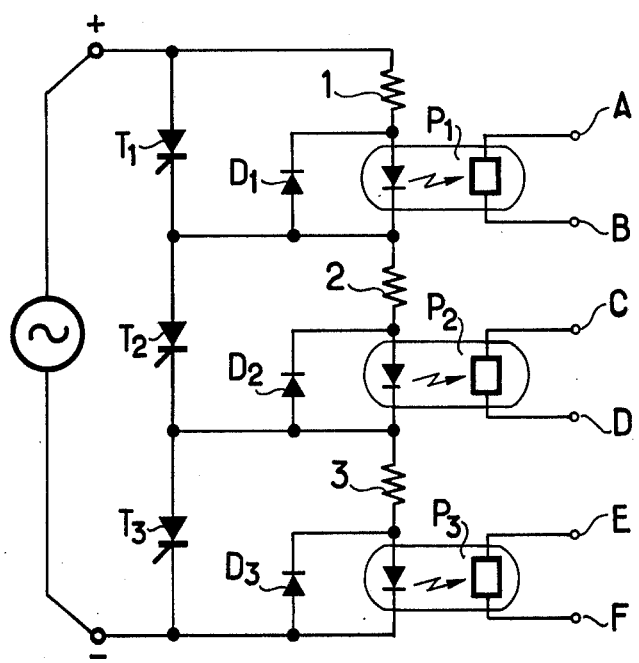
FIGS. 2 and 3 are general electronic diagrams of an automatic checking device for thyristors in the case where the current supply source is not uni-directional.

In FIG. 2, diodes such as D1, D2, D3, each arranged in an anti-parallel configuration with each of the electroluminescent diodes of the photo-couplers P1, P2, P3, may be distinguished. These diodes D1, D2, D3, can be added to the device in FIG. 1 as a measure for the protection of the photocouplers even in the case where the voltage applied to the thyristors is a direct current voltage.

Nevertheless, the case in FIG. 2 corresponds mainly to the case where the voltage applied to the thyristors is a direct-current voltage or a reverse voltage as may happen when a capacitor charged in one direction or in the reverse direction is arranged at the terminals of the thyristors.

Figure 3:
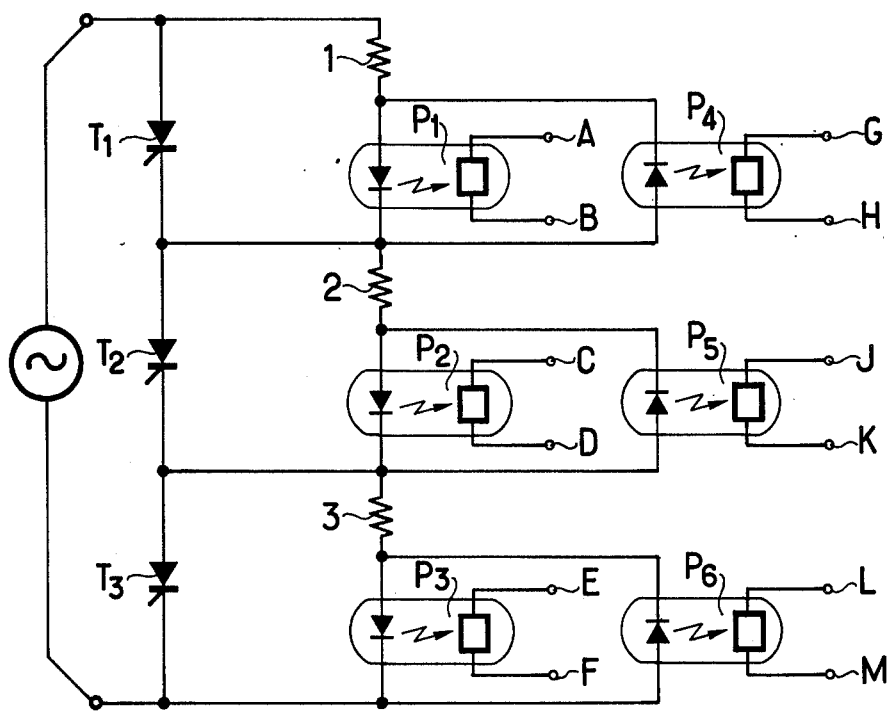

FIG. 3 shows photocouplers such as P4, P5, P6, each arranged in an anti-parallel configuration with each of the photocouplers P1, P2, P3. That arrangement is provided when a direct-current or reverse-current voltage is applied to the thyristors. The outputs of the photocouplers P4, P5, P6 are shown respectively by the paired terminals G, H; J, K; L, M.

When the voltage is a direct-current voltage and the thyristors are not controlled, the photocouplers P1, P2, P3 are lit up as in the case in FIG. 1.

When the voltage is a direct-current voltage and the thyristors are controlled, the photocouplers P1, P2, P3 are turned out.

When the voltage is reversed on each of the thyristors, each of the photocouplers P4, P5, P6 is lit up whereas the photocouplers P1, P2, P3 are not lit up.

The problem solved by the present invention consists in detecting if all the photocouplers P1, P2, P3 or P4, P5, P6 give the same information at the same instant. To do this, the differential information between P1 and P2 and P2 and P3 is detected. If a photocoupler does not give the same information as the others, an information indicating the defect to an alarm element, not shown in FIG. 1, such as a bell, an indicator light, etc., is produced at the output of the device.

Figure 4:
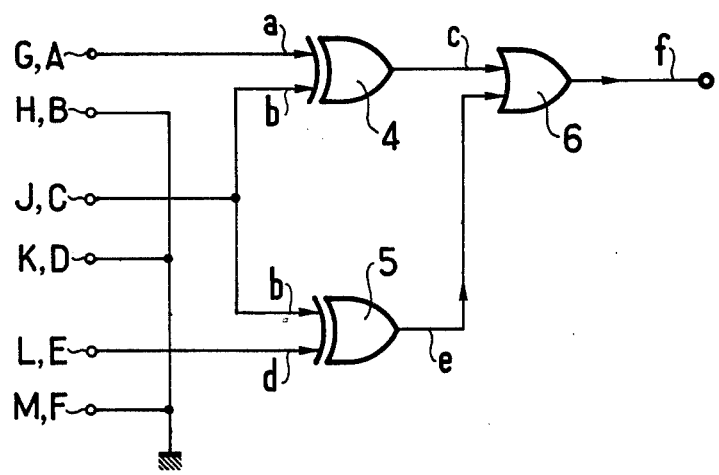
FIG. 4 is a block diagram of the logic elements arranged at the output of the elements in FIGS. 1, 2, 3.

FIG. 4 shows the outputs of the photocouplers P1, P2, P3, that is, A, B; C, D; E, F; which can also be the outputs of the photocouplers P4, P5, P6, that is, G, H; J, K; L, M; the case of the outputs A, B; C, D; E, F; will be examined; the outputs B, D, F are connected together and to the earth. The output A is connected to an input of an "exclusive OR" gate 4 thus giving a logic information $a$. The output C is connected on the one hand to the other input of the same gate 4 and on the other hand to a first input of a second "exclusive OR" gate 5 and transmits to those two doors 4 and 5 the same logic information $b$. The output E is connected to a second input of the gate 5 and transmits to the latter the logic information $d$. The outputs of the gates 4 and 5 are connected to the two inputs of an "OR" gate 6 supplying a logic information $f$ based on the informations $c$ and $e$ emerging from the gates 4 and 5.

For the gate 4 and 5, there are the following equations:

$$c = a.\bar{b} + \bar{a}.b$$

and $$e = b.\bar{d} + \bar{b}.d$$

For the gate 6 there is the logic equation:

$$f = c + e$$

The following truth tables make it possible to illustrate the logic operations in another form:

For the gate 4:

| a | 0 | 1 | 0 | 1 |
|---|---|---|---|---|
| b | 0 | 1 | 1 | 0 |
| c | 0 | 0 | 1 | 1 | in which 0 represents the information that the thyristor is conductive and 1 that it is blocked.

Likewise, for the gate 5:

| d | 0 | 1 | 0 | 1 |
|---|---|---|---|---|
| b | 0 | 1 | 1 | 0 |
| e | 0 | 0 | 1 | 1 |

For the gate 6:

| c | 0 | 1 | 0 | 1 |
|---|---|---|---|---|
| e | 0 | 1 | 1 | 0 |
| f | 0 | 1 | 1 | 1 | this meaning that the state 1 in which $f$ happens to be corresponds to a defect of one of the thyristors.

The device which is the object of the invention can be used in all cases where it is necessary to know that a component such as a thyristor used for controlling auxiliary equipment, motors or undulators is operating defectively.

Applications constituting a particular advantage concern the railway or underground railway field.

We claim:

1. A device for automatic checking of operating thyristors comprising: current supply source with terminals; a plurality of networks connected in series between said terminals, each network comprising a thyristor and a series combination of a resistor and a first light emitting diode, said combination being in parallel with the said thyristor, the direction of conduction of said first light emitting diode being the same as that of said thyristor; a plurality of first photosensitive elements, each element having a pair of outputs and associated with a respective one of said first diodes; a second light emitting diode for each network and a second photosensitive element associated with said second light emitting diode, said second light emitting diode being connected in antiparallel configuration with the said first light emitting diode; and means for grouping the outputs of said photosensitive elements two by two to provide information indicative of the state of said thyristors.

2. A device for automatic checking of thyristors according to claim 1, including first outputs of first photosensitive elements connected together and to ground potential; a plurality of exclusive OR gates, second outputs of said first photosensitive elements being connected two by two to input terminals of said "exclusive OR" gates, an OR gate, output terminals of said exclusive OR gates being connected to input terminals of said gate; and alarm means actuated by an output signal of said OR gate.

3. A device for checking of thyristors, according to claim 2, including first outputs of said second photosensitive elements connected together and to ground potential; a plurality of auxiliary exclusive OR gates, second outputs of said second photosensitive elements being connected two by two to input terminals of said auxilliary exclusive OR gates, an auxiliary OR gate, output terminals of said auxiliary exclusive OR gates being connected to input terminals of said auxiliary OR gate; an output signal of said auxiliary OR gate actuating said alarm means, whose output terminal supplies the defect signal actuating an alarm device.

4. A device according to claim 3 wherein said source of current is an alternating source, said alarm means being actuated upon detection of only a short-circuit of one of said thyristors.

* * * * *